Figure 1:
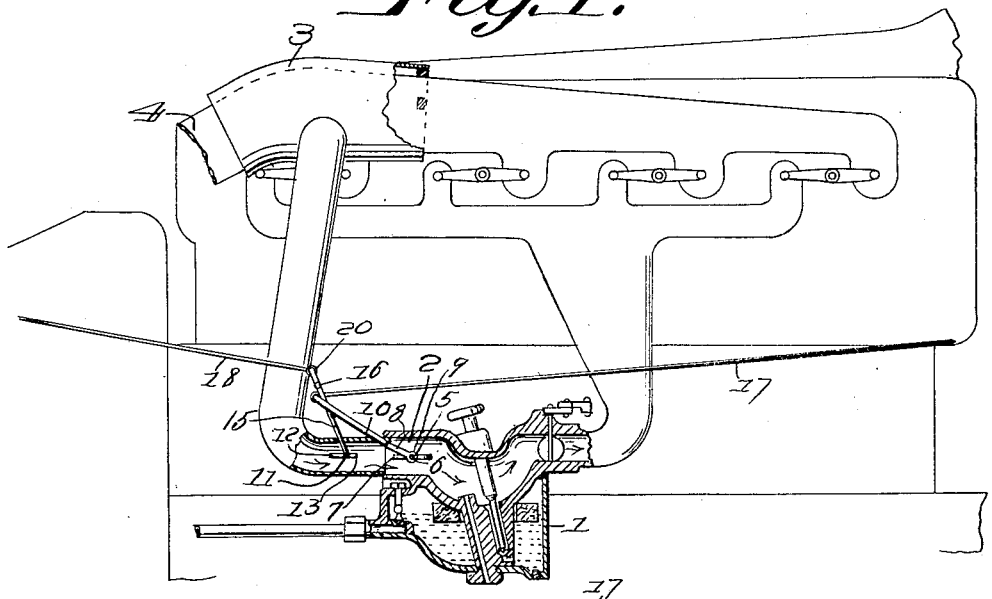

J. C. WURSTER.
HOT AIR CONTROLLING DEVICE FOR AIR INTAKE OF CARBURETERS.
APPLICATION FILED JAN. 26, 1920.

1,371,189.

Patented Mar. 8, 1921.

Inventor
J. C. Wurster,
By Watson E. Coleman.
Attorney

UNITED STATES PATENT OFFICE.

JOHN C. WURSTER, OF LENOX, IOWA.

HOT-AIR-CONTROLLING DEVICE FOR AIR-INTAKE OF CARBURETERS.

1,371,189.     Specification of Letters Patent.     Patented Mar. 8, 1921.

Application filed January 26, 1920. Serial No. 354,103.

*To all whom it may concern:*

Be it known that I, JOHN C. WURSTER, a citizen of the United States, residing at Lenox, in the county of Taylor and State of Iowa, have invented certain new and useful Improvements in Hot-Air-Controlling Devices for Air-Intake of Carbureters, of which the following is a specification, reference being had to the accompanying drawings.

The carbureters of Ford automobiles as a rule, particularly in the cold season have the air intake pipe terminating in an air chamber either partially or entirely surrounding the exhaust manifold, so as to derive heat from the manifold, for heating the air to the carbureter, in order to more thoroughly vaporize the gasolene, thereby insuring a better mixture, and at the same time resulting in a quicker generation of the mixture.

In connection with this hot air intake pipe of the carbureter, it is the aim to provide the controlling device coöperating with the usual air intake valve, to more thoroughly and accurately control the supply of hot air to the carbureter.

Heretofore, the engine of a Ford automobile is very seldom kept operating when the ordinary air intake valve is released, unless the carbureter is open more than is needed for operating with the engine warmed up, therefore, an object of the present invention is to provide an auxiliary air controlling valve, adapted to be so manipulated in conjunction with the ordinary air controlling valve as to keep the engine running when the ordinary valve is released.

A further object of the invention is that by the provision of such an auxiliary hot air controlling valve, considerable cranking of the engine will be saved.

Furthermore, by the provision of this auxiliary air controlling valve, the usual adjustment of the carbureter is eliminated, that is, after the carbureter has been once properly adjusted, thus insuring a uniform mixture of gasolene and also a better running engine.

While the design and construction at present illustrated and set forth are deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figures 2, 3:
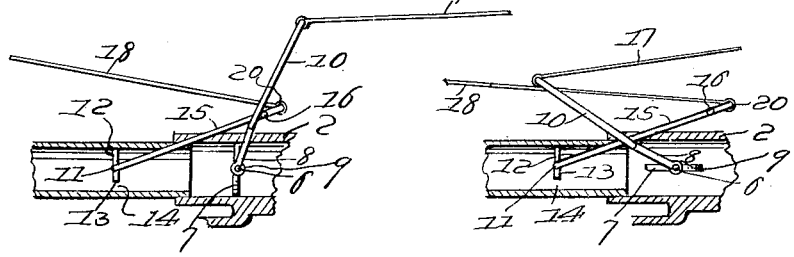

In the drawings:

Figure 1 is a view showing the usual construction of carbureter of the Ford automobile and illustrating the air intake pipe to the carbureter, leading from a heater, which is adjacent the exhaust manifold, and also showing the hot air intake pipe in section, showing the dominant and auxiliary air controlling valves, Fig. 2 is a sectional view through the hot air intake pipe of the carbureter, showing the dominant and auxiliary air intake valves closed, Fig. 3 is a view similar to Fig. 2, but showing the dominant hot air intake valve open and the auxiliary air intake valve closed, which allows a certain amount of air to enter the carbureter.

Figures 4, 5:
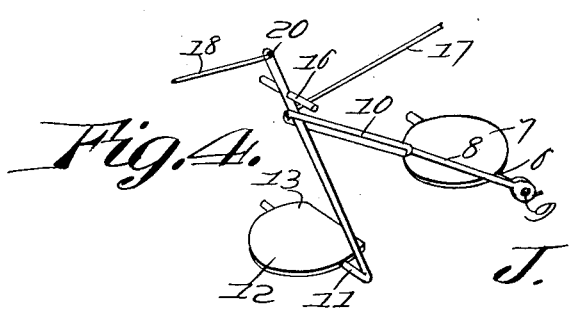

Fig. 4 is a detail perspective view of the operating parts of the dominant and auxiliary intake valves; and Fig. 5 is a detail perspective view of the dominant valve.

Referring more especially to the drawings, 1 designates the usual carbureter of a Ford automobile and 2 denotes the air intake pipe leading to the carbureter. This air intake pipe 2 terminates in a heater casing 3, which partially surrounds the exhaust manifold 4 of the engine, so that the air which is taken into the heater casing may derive heat from the exhaust manifold. This heated air is conducted, by way of the pipe 2, into the carbureter.

Mounted in bearings 5 of the air intake pipe are the pintles 6 of the usual air intake valve 7. An arm 8 is fastened as at 9 to one of the pintles of the ordinary air intake valve, and this arm terminates in a loop 10. Also mounted in bearings of the air intake pipe 2 are the pintles 11 of the auxiliary air intake valve 12. It is to be noted that the auxiliary air intake valve 12 is not entirely circular, in other words a portion of the valve is cut away, thereby causing a smaller part 13 to be formed on one side of the pivot of the valve, than the other part on the opposite side of the pivot. By the provision of a valve of this kind, it will be seen that when the valve is disposed in a position directly at right angles to the air intake pipe, a small portion of the passage of the pipe will be left open as indicated at 14, which will permit a small portion of air to enter the carbureter, provided that the dominant air intake valve is open. An arm 15 is made fast to one of the pintles of the auxiliary air intake valve, and passes through the loop 10 of the arm 8 of the valve 7. The arm 15 has a transverse pin or bar 16, which lies across the loop 10. A suitable operating rod 17 is connected to the arm 8 for rocking the dominant air intake valve. A second operating wire 18 is provided and is connected at 20 to the end of the arm 15.

Referring to Fig. 1 it will be noted that the two valves 7 and 12 are both open, in which case the engine is operating under a full supply of air. Therefore, when it is desired to cut off the full supply and stop the engine a pulling action is imparted upon the rod 17, which closes both valves 7 and 12, as in Fig. 2. In other words when the pulling action is imparted on the rod 17, the valve 7 is caused to close, and the closing of this valve, will likewise effect the closing of valve 12, through the medium of the connections of the loop 10 with the arm 15 and its coöperation with the transverse pin 16. It will be noted that a part of the valve 12 is cut away, or smaller on one side of the pintles 11, as at 13, thereby leaving a small opening as at 14. Should the valve 7 be open, it is apparent that a small supply of air may enter the carbureter through the opening 14, which will prevent flooding of the engine, whereas should there only be a single valve, such as 7, a full supply of air would be allowed to enter the carbureter, if such valve should be open. However, being that there are two valves, one completely closing the air passage, the other partially closing the passage, it will be seen that when the dominant valve 7 is opened as shown in Fig. 3, by imparting a pushing action on the rod 17, a small supply of air will enter the carbureter, thus preventing flooding the engine, and thus keeping the engine operating or running. Hence, as the engine warms up the valve 12 can be opened gradually by pulling upon the rod 18. At this stage of the operation, if desired, the supply of gasolene may be reduced, thereby governing the character of the mixture or charge. As shown in Fig. 1 both valves 7 and 12 are entirely open, thus permitting a full supply of air to enter the carbureter. When it is desired to cut off the full supply of air to the carbureter and therefore stop the engine, pulling action may be imparted upon the rod 17, in which case the loop 10 of the arm 8 will bear or operate against the cross pin or bar 16, thus tilting the arm 15, and move the valve 12 to a closed position, at right angles to the air intake pipe 2.

The invention having been set forth, what is claimed as new and useful is:—

1. In a device as set forth, the combination with the carbureter of an automobile engine, and the hot air intake pipe to the carbureter, of a dominant air intake controlling valve mounted in said pipe and having an arm, an auxiliary air intake controlling valve mounted in the air intake pipe so constructed as to be adapted to partially close the passage through the air intake pipe, means for opening and releasing the dominant valve, a connection between the auxiliary valve and the operating means of the dominant valve, whereby when the dominant valve is closed, the auxiliary valve is likewise closed, and means for gradually opening the auxiliary valve after the dominant valve has been released to allow it to open.

2. In a device as set forth, the combination with a carbureter of an automobile engine, and a hot air intake pipe connected to the carbureter, of a dominant air intake valve in said pipe, an auxiliary air intake valve mounted in said pipe and so constructed and adapted when in closed position to partially close the passage through said pipe, and a connection between the two valves, the construction, arrangement and operation of which being such, that when said connection is operated, the valves may be simultaneously opened and successively closed, or simultaneously closed and successively opened.

3. In a device as set forth, the combination with a carbureter of an automobile engine, and a hot air intake pipe connected to the carbureter, of a dominant air intake valve in said pipe, an auxiliary air intake valve mounted in said pipe and so constructed and adapted when in closed position to partially close the passage through said pipe, a connection between the two valves, whereby the closing of one of the valves closes the other, the construction and arrangement of said connection being such that the closing of one of the valves need not affect the position of the other valve, and means for gradually opening the auxiliary valve.

4. In a device as set forth, the combination with a carbureter of an automobile engine and the hot air intake pipe connected thereto, of dominant and auxiliary air intake valves mounted in said pipe, the latter being cut away, whereby when the latter is closed, the passage through the pipe will be partially open, a connection between the two valves, whereby when the former is closed, the latter will likewise be closed, said connections being of such construction that when the former valve is released, the position of the latter will not be affected.

5. In a device as set forth, the combination with a carbureter of an automobile engine and the hot air intake pipe connected thereto, of dominant and auxiliary air intake valves mounted in said pipe, the latter being cut away, whereby when the latter is closed, the passage through the pipe will be partially open, a connection between the two valves, whereby when the former is closed, the latter will likewise be closed, said connections being of such construction that when the former valve is released, the position of the latter will not be affected, and means for gradually opening the latter valve.

6. In a device as set forth, the combination with a carbureter of an automobile and a hot air intake pipe connected thereto, of dominant and auxiliary air intake valves mounted in said pipe, the latter having a part cut away, and adapted when it is closed to only partially close the passage of said pipe, the former valve having an operating arm provided with a loop, the latter having an operating arm provided with a cross bar overlying said loop, so that when the operating arm of the former valve is moved for closing the valve, the latter valve will also be closed, means for operating and releasing the arm of the former valve, and when it is released the action of the operating arm will not affect the operating arm of the latter valve.

7. In a device as set forth, the combination with a carbureter of an automobile and a hot air intake pipe connected thereto, of dominant and auxiliary air intake valves mounted in said pipe, the latter having a part cut away, and adapted when it is closed to only partially close the passage of said pipe, the former valve having an operating arm provided with a loop, the latter having an operating arm provided with a cross bar overlying said loop, so that when the operating arm of the former valve is moved for closing the valve, the latter valve will also be closed, means for operating and releasing the arm of the former valve, and when it is released, the action of the operating arm will not affect the operating arm of the latter valve, and means connected to the operating arm of the latter valve for gradually opening the latter valve.

In testimony whereof I have hereunto affix my signature.

JOHN C. WURSTER.